United States Patent Office 3,493,345
Patented Feb. 3, 1970

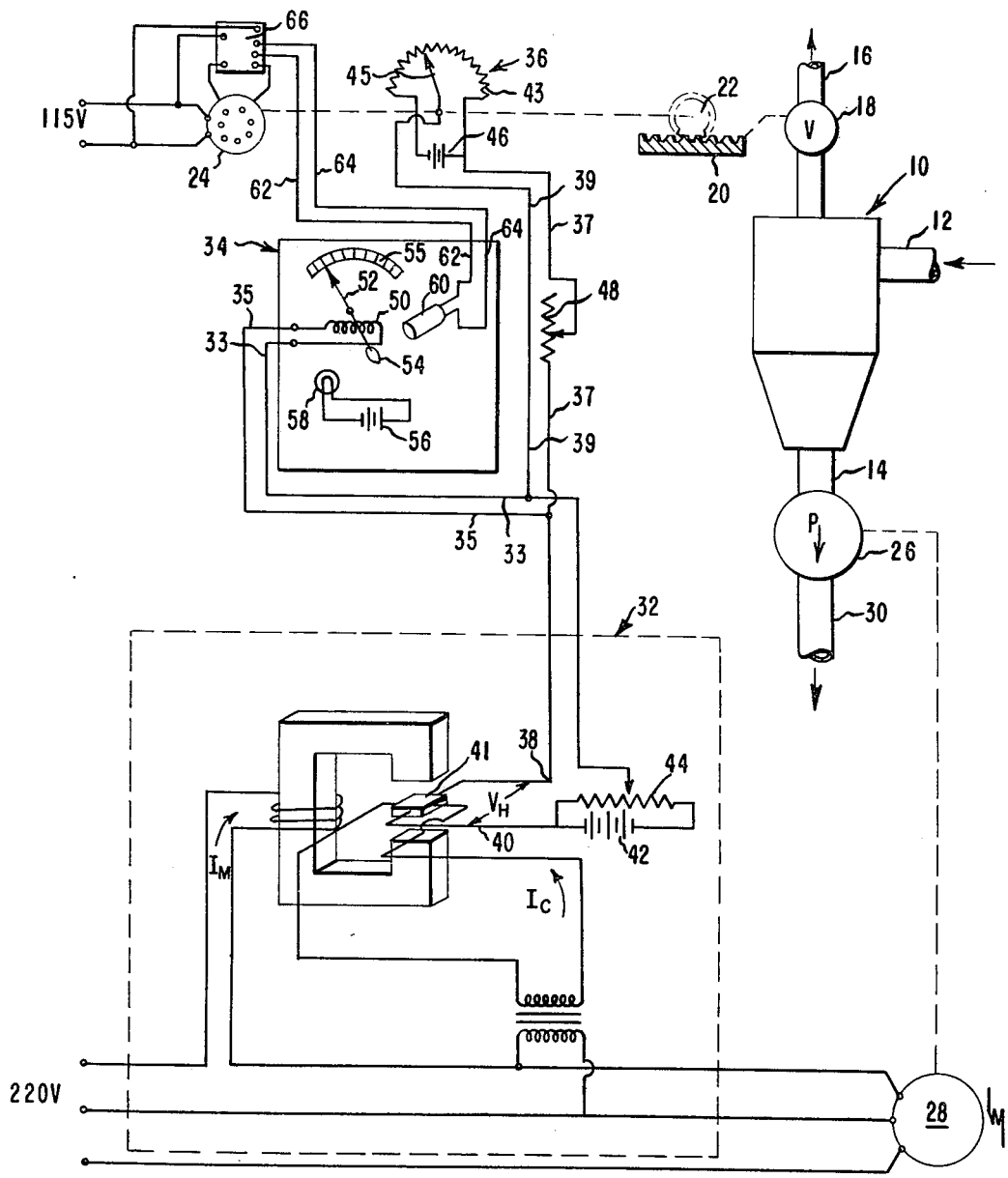

3,493,345
METHOD OF CONTROLLING POLYMER VISCOSITY DURING SYNTHESIS BY UTILIZING MOTOR LOAD
William Thomas Windley, Seaford, Del., assignor to E. I. du Pont de Nemours and Company, Wilmington, Del., a corporation of Delaware
Filed Dec. 20, 1967, Ser. No. 692,010
Int. Cl. G01n 11/14, 19/00
U.S. Cl. 23—230                                            4 Claims

ABSTRACT OF THE DISCLOSURE

A method for controlling a continuous polymerization process wherein variations in viscosity of a melt being moved by an element driven by a motor cause corresponding variations in power consumed by the motor. These variations are detected and converted to equivalent electrical signals which initiated operation of a process control device.

BACKGROUND OF THE INVENTION

This invention relates to an improved method of automatically controlling the viscosity in a continuous polymerization process. In particular, the improvement comprises using the deviations in electrical power supplied to the motor driving an in-process polymer-moving element to control the process.

It is well known that process variables, such as temperature, pressure, additives, etc., control the viscosity of a polymer during the polymerization process. By keeping all of these variables essentially constant, the viscosity can be controlled quite accurately by varying one of the process variables as needed to compensate for uncontrollable minor upsets. As for example, at elevated temperatures the degree of polymerization of fiber-forming polyamides is a function of and is limited by the amount of water present by virtue of the dynamic equilibrium involving polymer and water on the one hand, and depolymerized polymer or even the reactants on the other. Control of the degree of polymerization is frequently obtained by controlling the amount of water removed as steam in a steam-polymer separator. Such a system is shown in U.S. Patent No. 3,113,843. By controlling the pressure in the steam-polymer separator, the degree of polymerization is controlled.

In operation of processes of the type described above, it is frequently desired to ascertain quickly the fluid viscosity of the polymer in the system and to detect deviations from optimum or acceptable conditions so that an operator can take corrective action or so that a control unit influencing the process variable regulating viscosity can be actuated in a corrective direction. Existing techniques for this purpose require a viscosity measuring element in the process stream and it is extremely difficult to maintain the calibration of such a sensitive measuring element. This is particularly true at the high temperatures and viscosities encountered in polymerizing high viscosity synthetic polymer melts, such as 66 nylon.

It is, therefore, highly desirable to have a simple, inexpensive, reliable continuous method of determining and controlling viscosity, in which normal processing elements can be used for determining viscosity without the need for adding special measuring elements in the polymer flow stream.

SUMMARY OF THE INVENTION

In a process for polymerizing synthetic polymers wherein the fluid viscosity is controlled by a process variable and the polymer is moved at an essentially constant rate by a mechanical element which is driven by an electrical motor, it was discovered that variations in viscosity caused corresponding variations in power consumed by the motor and that by continuously detecting the power consumed by the motor, and generating electrical signals equivalent to the power consumed by the motor the signals may be read out whereby the viscosity of the polymer can be determined. According to a further feature of the invention, there is provided a control unit responsive to the electrical signals and actuated thereby for influencing the operating conditions. The control unit may include a motor operated process valve wherein the motor is caused to rotate in one direction or the other in accordance with the electrical signals produced. The mechanical element may be a pump or a mixing blade.

BRIEF DESCRIPTION OF THE DRAWING

A schematic diagram of a continuous polymerizing process using the improved method of controlling viscosity.

DESCRIPTION OF THE ILLUSTRATED EMBODIMENT

An embodiment for practicing the method of this invention is described in controlling the pressure in a steam-polymer separator by measuring the viscosity of the molten polymer leaving the separator. As shown in the drawing, separator 10 has an inlet pipe 12, a discharge pipe 14, and a vent pipe 16. In the vent pipe 16, there is valve 18 which is positioned by rack 20. The rack 20 is in turn positioned by gear 22 driven by the valve control motor 24 connected to a 115 v. power supply. The pressure in separator 10 is determined by the position of valve 18 and the vacuum applied to the vent pipe 16. If no vacuum is applied, then the pressure of the separator 10 will always be above atmospheric, whereas if a vacuum is applied to the vent pipe 16, it is possible to obtain sub-atmospheric pressures. Pump 26, driven by pump motor 28, forces the output of separator 10 through transfer line 30. Pump 26 normally operates at a constant discharge pressure. The power consumed by the pump motor 28 is measured by wattmeter 32. The output of this wattmeter is fed through leads 33, 35 to the optical meter relay 34. A feedback signal from the valve position indicator 36 is also fed to the optical meter relay 34 through leads 37, 39.

The position indicator 36 includes an adjustable potentiometer 43 connected to a DC supply 46, and a wiper 45 which is driven by control motor 24, the wiper being connected to lead 39. This arrangement provides a feedback signal through leads 37, 39 corresponding to the degree of actuation of valve 18.

Three-phase AC power is supplied to pump motor 28. Normally pump motor 28 is a synchronous motor so its speed can be closely controlled. Wattmeter 32 is a commercial unit known generically as a Hall-Effect wattmeter. It is well known that when the current and voltage supplied to pump motor 28 is impressed appropriately across the Hall plate 41 of wattmeter 32, an output voltage signal known as the "Hall voltage" $V_h$ is generated across leads 38 and 40. DC supply 42 is a bias voltage paralleled by potentiometer 44 and connected in series with lead 40 to provide an incremental adjustment to the output of Hall plate 41. This arrangement is commonly known as biasing or zero suppression circuitry and is used to provide signals from wattmeter 32 which are variations from a predetermined level of the power consumed by the motor 28.

Meter coil 50 of the meter relay 34 positions needle 52 which carries at one end a blade 54. The summation of the biased Hall voltage signal fed through leads 33, 35 and the feedback voltage signal fed through leads 37, 39 impressed upon meter coil 50 positions needle 52 and an indication of the combined output is shown on the dial 55 which can be calibrated to read out in units of viscosity. DC supply 56 supplies power to bulb 58 which is directed to shine upon photo diode 60. Blade 54 is positioned so as to be able to block portions of the light from bulb 58. The output signal of the photo diode 60 in leads 62, 64 is the combined difference signal from the wattmeter 32 and the feedback signal from the position indicator 36, and gives a signal proportional to the position of needle 52. Depending upon the electrical resistance of photo diode 60, motor 24 is caused to rotate in one direction or the other, depending on the polarity and magnitude of the signal fed through leads 62, 64 to the motor field switching circuit 66 of motor 24, thus positioning valve 18.

In operation, a mixture of steam and polymer is supplied through inlet pipe 12 into the separator 10. The position of valve 18 controls the pressure in separator 10 and thus controls the amount of steam removed and the final melt viscosity. Pump 26 delivers the polymer into transfer line 30 under essentially constant pressure conditions. The power used by pump motor 28 is dependent upon the shear forces generated in pumping. It has been found that minor variations in melt viscosity are easily detected by the sensitive Hall-Effect wattmeters which generate signals equivalent to the variations. These signals are measured and are used to actuate motor 24 which controls the position of valve 18, making minor adjustments in the pressure in separator 10 so as to give the desired viscosity.

If it is impossible to maintain the discharge pressure of pump 26 constant, an alternate embodiment would be to use a bypass pump which taps a sample of the molten polymer from discharge pipe 14. The variations in the electrical power used to move this sampling flow can be used to control. There are also many processes where the final viscosity is controlled by mixing an additive or some basic ingredient and having a mixing step. It has been found that measuring the amount of power used to drive the mixing blade is sensitive to the viscosity and can be used to control the flow of additive so as to obtain the desired viscosity.

While one specific control system has been illustrated, it should be obvious that other control systems can be used equally as well. It is further apparent that many changes and modifications can be made to the disclosed apparatus without departing from the spirit of the present invention which is intended to be limited only to the scope of the appended claims.

What is claimed is:

1. In a process system for polymerizing synthetic polymers wherein polymer viscosity is regulated by actuation of a control unit and the polymer is moved at an essentially constant rate through the system by at least one mechanical element driven by an electric motor and wherein variations in viscosity cause corresponding variations in power consumed by the motor, an improved method of regulating the viscosity comprising the steps of:
    (a) continuously detecting power consumed by the motor;
    (b) generating electrical signals equivalent to the power consumed by the motor;
    (c) feeding said signals to the control unit for actuation thereof.

2. The method of claim 1 wherein said electrical signals are equivalent to variations from a predetermined level of power consumed by the motor.

3. In a process system for polymerizing synthetic polymers wherein polymer viscosity is regulated by actuation of a control unit and the polymer is moved at an essentially constant rate through the system by at least one mechanical element driven by an electric motor and wherein variations in viscosity cause corresponding variations in power consumed by the motor, an improved method of regulating the viscosity comprising the steps of:
    (a) continuously detecting power consumed by the motor;
    (b) generating a first electrical signal equivalent to the power consumed by the motor;
    (c) generating a second electrical signal of opposite polarity corresponding to the degree of actuation of the control unit;
    (d) combining said first and second signals to provide a difference signal;
    (e) feeding said difference signal to the control unit for actuation thereof, 4. The method of claim 3 wherein said first electrical signals are equivalent to variations from a predetermined level of power consumed by the motor.

References Cited

UNITED STATES PATENTS

| | | |
|---|---|---|
| 2,536,806 | 1/1951 | Hansen. |
| 2,711,750 | 6/1955 | Norcross. |
| 2,904,401 | 9/1959 | Booth _____ 23—285 X |
| 3,036,334 | 5/1962 | Hayden. |
| 3,113,843 | 12/1963 | Li. |
| 3,241,599 | 3/1966 | Jobe. |
| 3,357,955 | 12/1967 | Bryan _____ 260—78 |

MORRIS O. WOLK, Primary Examiner

S. MARANTZ, Assistant Examiner

U.S. Cl. X.R.

23—253, 285, 1; 137—92; 73—59; 260—78, 695